Aug. 8, 1967 J. GARDBERG 3,335,405

DECODING SYSTEM

Filed Aug. 5, 1963 2 Sheets-Sheet 1

INVENTOR.
Joseph Gardberg
BY Mueller & Aichele
Attys.

Aug. 8, 1967 J. GARDBERG 3,335,405

DECODING SYSTEM

Filed Aug. 5, 1963

2 Sheets-Sheet 2

INVENTOR.
Joseph Gardberg.
BY Mueller & Aichele
Attys.

United States Patent Office
3,335,405
Patented Aug. 8, 1967

3,335,405

DECODING SYSTEM

Joseph Gardberg, Chicago, Ill., assignor to Motorola, Inc., Chicago, Ill., a corporation of Illinois Filed Aug. 5, 1963, Ser. No. 299,920
15 Claims. (Cl. 340—164)

ABSTRACT OF THE DISCLOSURE

Transistorized pulse decoder including pulse counter for receiving input pulses and converting the same to an analog voltage and digit counter for selecting resistors providing analog voltages corresponding to predetermined numbers. An interdigit timer responds to spaces between pulses and resets the pulse counter and steps the digit counter. A null detector indicates when the analog voltage from the pulse counter and the number selected by the digit counter correspond and cooperates with a reset gate which resets the digit counter when the number of applied pulses is not the selected number.

This invention relates generally to digital decoding devices and more particularly to a transistorized decoding device which responds to a multiple digit calling code to operate audible and/or visible indicators when a particular calling code is received.

There are many applications in which it is desired to use a calling code made up of a multiple digit number. For communications, a particular station in a system including a large number of stations may be alerted by providing a response to a predetermined code number. In such case it is desired to provide a decoder of standardized construction which can be easily set to respond to any desired code number for use at any station in the system.

In the past it has been customary to use electromechanical devices such as stepping switches to respond to dial pulses and cause mechanical members to move to establish particular circuits when the switches reach preset positions. Such mechanical devices are large and expensive and are relatively slow in operation. While transistorized decoding devices have been used to reduce size and cost, these devices have not been entirely satisfactory and have been difficult to change the code setting as required in originally setting up the codes used in the system, or to change the codes which are to be used.

It is therefore an object of the present invention to provide an improved digital decoder.

Another object of the invention is to provide a transistorized digital decoder wherein a particular code can be set up in a very simple manner.

A further object of the invention is to provide a transistorized digital decoder for a radio telephone system which receives pulse signals and produces an output when the pulses corresponding to a particular code are received.

A feature of this invention is the provision of a digital decoder including a first counter for providing an analog voltage corresponding to the number of a digit, which is compared with an analog voltage preset for such digit by selection of a resistor corresponding to the digit.

Another feature of the invention is the provision of an improved null detector which compares two voltages and produces an output when the voltages are the same. The null detector is transistorized and is temperature compensated to provide reliable operation over a range of operating temperatures.

A further feature of the invention is the provision of a decoder for responding to a multiple digit code number including a binary counter connected through summing resistors to provide a voltage representing the numeral of a digit of the code number received, a ring counter having stages corresponding to the digits in the code number which are selectively coupled to different resistors to preset voltage values corresponding to the numerals of the digits, and a timer which responds to the beginning and end of a pulse group to reset the binary counter for each digit and actuate the ring counter to successive stages for successive digits. The timer also resets the ring counter if the pulses received do not correspond to the value preset for the digit.

The invention is illustrated in the drawings wherein.

In practicing the invention a transistorized decoder is provided having an input detector which responds to coded tone signals to produce pulses. The pulses are applied to a binary counter having four stages and arranged to count up to ten as required to count the pulses for each digit. Summing resistors are connected to the stages of the binary pulse counter to provide a voltage at one input of a null detector which represents the numeral of the digit counted. A ring counter is provided having a number of stages corresponding to the digits in the code number to be received. The pulses from the detector are also applied to an inter-digit timer which responds to the initial pulse of each group to actuate the ring or digit counter to operate from one stage to the next. This timer also resets the pulse counter at the end of each pulse group and applies pulses to a reset gate for the ring counter and to the output gate. The stages of the digit counter are connected through a switching arrangement to resistors having values corresponding to the numerals of the digits of the code number. These resistors are connected to a second input of the null detector so that voltages from the resistors selectively connected by the ring counter can be compared with the voltages produced by the summing resistors connected to the pulse counter. The null detector is connected to the reset gate to inhibit the resetting of the ring counter when the two voltages applied to the null detector are the same. When a null is present for each of the digits of the code number, an output gate operates to actuate a buzzer or other audible device, and a call light or other visible device. When the ring counter is reset it resets the ring relay for a further operation. The call light will continue to indicate that a call has been received until it is manually reset by the operator.

Figures 1, 3:
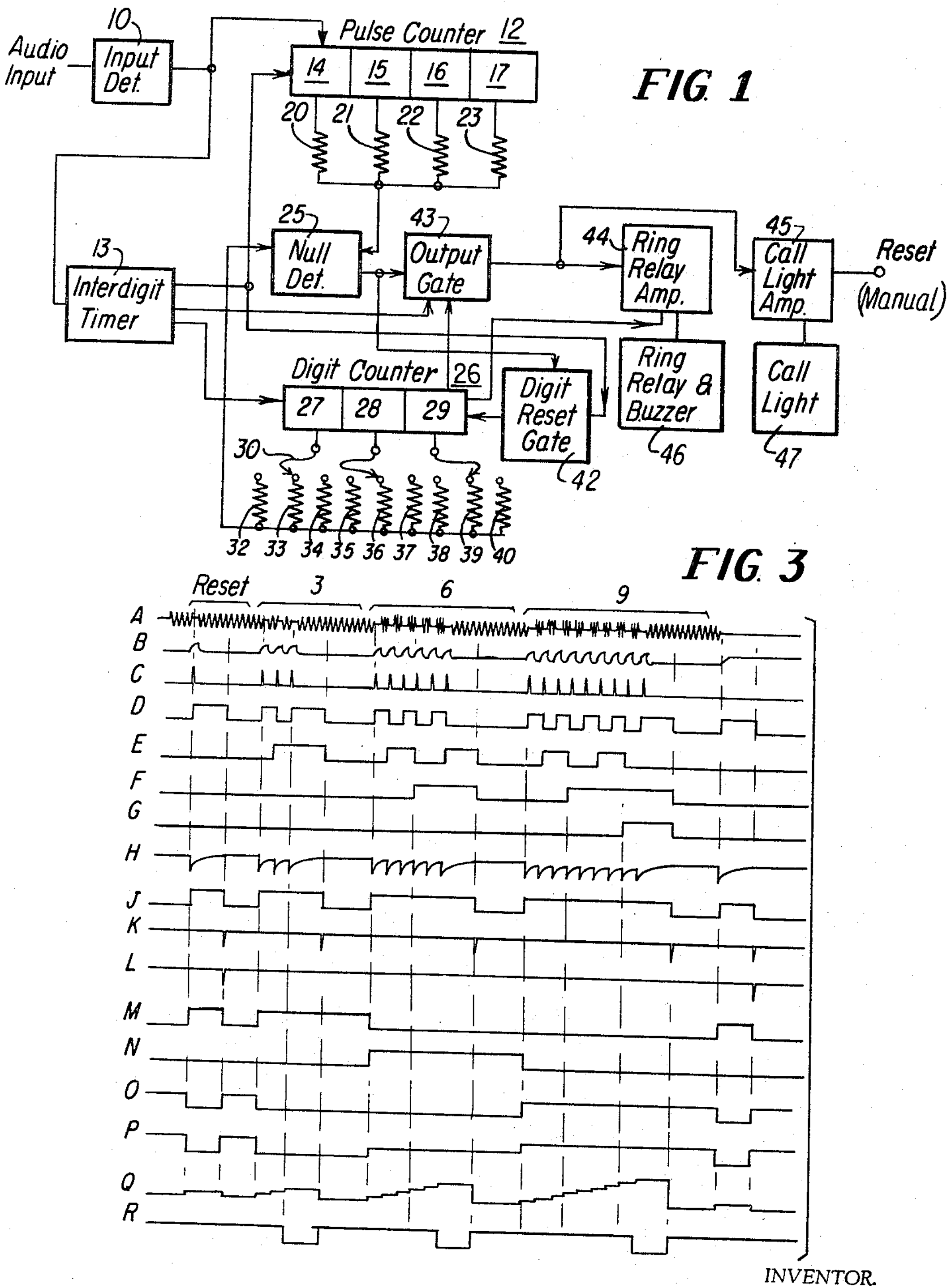
FIG. 1 is a block diagram of the decoder system of the invention.
FIG. 3 is a timing chart illustrating the operation of the system.

Referring now to the drawings, FIG. 1 shows a block diagram of the system which responds to pulsed tone signals. The input detector 10 responds to received signals of a particular frequency and applies pulses to pulse counter 12 and interdigit timer 13 when the tone signal is interrupted or terminated. The pulse counter may be a standard binary counter having four bistable stages 14, 15, 16 and 17. These stages are selectively operated by the pulses representing each digit of a code number, with the stages representing the numbers 1, 2, 4 and 4 so that the various combinations produce all numbers from 2 to 10. Connected to the counter stages 14, 15, 16 and 17 are summing resistors indicated as 20, 21, 22 and 23, respectively, having values corresponding to the numbers represented by the stages. The current through the summing resistors is combined and applied to produce a first input voltage to the null detector 25.

The interdigit timer 13 also receives the pulses, and responds to the initial pulse of a pulse group and acts to apply a pulse to digit counter 26, which may be a standard ring counter. Digit counter 26 has a number of stages corresponding to the number of digits in the code number being used, and in the example illustrated has three stages 27, 28 and 29. The stages of the digit counter 26 are selectively connected to a plurality of resistors 32, 33, 34, 35, 36, 37, 38, 39 and 40. These resistors have values corresponding to the numbers 2 through 10 and are connected in common to a second input of null detector 25. As will be understood from a further description of the system, only one of the resistors 32 to 40 will be operative at any particular time.

The interdigit timer 13 applies a reset pulse to the pulse counter 12 at the end of each pulse group so that it is conditioned for the pulses of the next digit. The timer 13 also applies a reset pulse to digit reset gate 42 to reset the digit counter if the number of pulses received in a pulse group do not correspond to the numeral set up for that digit in the ring counter. Then on the initial pulse of the next pulse group, the timer 13 again actuates the digit counter so that the next stage thereof is operative.

The null detector 25 is arranged to apply a pulse to inhibit action of digit reset gate 42 when the voltage applied by the summing resistors corresponds to the voltage applied by the resistor connected by the ring counter. If the pulses of a digit operate counter 12 so that the current through summing resistors 20, 21 22 and 23 in parallel provides a voltage at the first input of the null detector, which is the same as the voltage at the second input thereof from the current through the individual resistor (32 to 40) which is connected by the actuated stage of the digit counter, the inhibit pulse will be applied to the digit reset gate so that this gate will not operate to reset the digit counter 26. This means that the system will go on to the next digit before making a decision.

The null detector 25 is also coupled to output gate 43 and applies a pulse thereto each time the voltages at its two inputs are the same. A pulse is also applied to the output gate 43 from the last stage 29 of the digit counter 26, indicating that the null detector has responded to the last digit of the code number. However, the output gate is actuated only when a pulse is applied thereto from interdigit timer 13 indicating the end of a pulse group. Accordingly, when the null detector 25 inhibits the digit reset gate at the end of each pulse group to show that the pulses representing each digit are the number to be selected by the decoder, then the output gate is operated by simultaneous pulses from the null detector 25, the third stage 29 of the digit counter, and the interdigit timer 13.

The output gate applies a pulse to the ring relay amplifier 44 and to the call light amplifier 45. The ring relay amplifier operates relay 46 which controls a buzzer or other signal device which may be provided at any desired location, such as in a control room. The call light amplifier energizes a call light 47 or other signal device which may also be positioned at any desired location. When the digit counter is reset, a reset pulse is applied therefrom to the ring relay amplifier 44 to turn off the relay controlling the buzzer. The call light, however, is not reset by the digit counter and remains energized until reset by the operator through a manual control.

Figure 2:
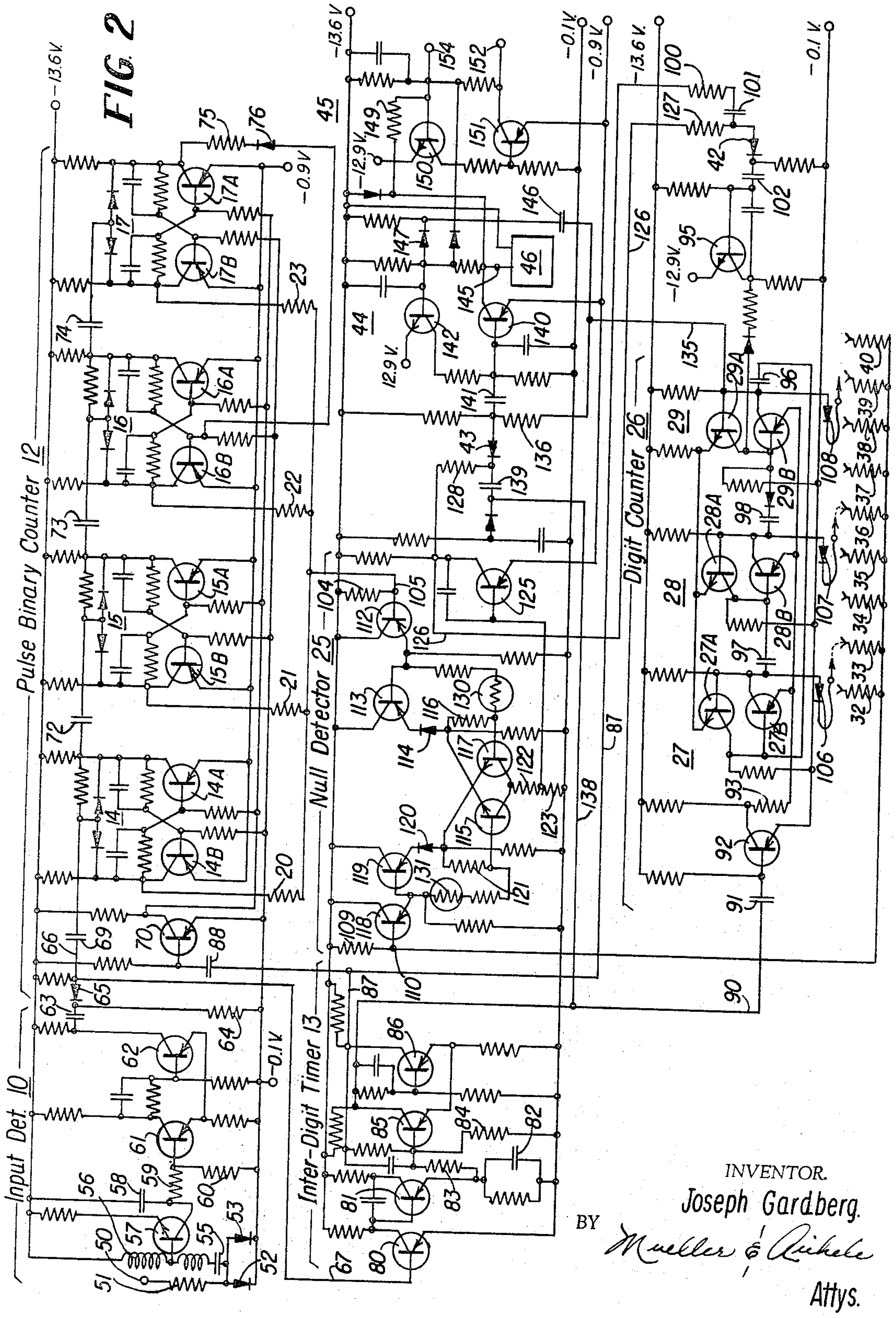
FIG. 2 is a complete circuit diagram of the decoder.

The complete circuit diagram of the decoder is shown in FIG. 2. This will be described in detail in connection with the diagrams of FIG. 3 which illustrates the operation of the various elements. The same reference characters are used in FIG. 2 is in FIG. 1 for the parts shown therein.

The signal used to transmit the calling code may be an audio signal at a frequency of the order of 1500 cycles. This signal is interrupted or terminated to represent the numbers of the digits of the code numbers. The number 1 is used for reset operation so that it cannot be used for a digit of the number. A one or reset pulse is transmitted at the beginning of each code number to condition the decoder for operation, and again at the end of the pulse groups representing the code number.

In the circuit of FIG. 2, the input audio signal is applied from input terminal 50 to a clipping circuit including resistor 51 and diodes 52 and 53. In order to select the desired tone, a series tuned circuit including capacitor 55 and coil 56 is provided. A tap on coil 56 is connected to the base electrode of transistor 57 to apply the selected signal thereto. Transistor 57 is normally cut off and when the selected signal is applied thereto, it is rectified by the base-emitter junction of transistor 57 and causes transistor 57 to conduct. Capacitor 58 is charged through resistors 59 and 60, and when transistor 57 conducts capacitor 58 discharges. The signal appears at the collector of transistor 57 in amplified form and is filtered by capacitor 58 and resistor 59 and applied across resistor 60 as a negative DC potential.

The voltage across resistor 60 is applied to a Schmitt trigger circuit formed by transistors 61 and 62. In the absence of a signal, transistor 61 is biased to cut off and transistor 62 is in saturation. When the tone signal is received so that a negative potential appears across resistor 60, this will cause transistor 61 to saturate and transistor 62 to be cut off. This produces a negative going step at the collector of transistor 62 which is differentiated by capacitor 63 and resistor 64, but is blocked by diode 65. When the tone signal is interrupted, a positive going pulse is developed across resistor 60 which will cut off transistor 61 and saturate transistor 62. This results in a positive going step at the collector of transistor 62 which is differentiated by capacitor 63 and resistor 64. This positive pulse will be passed by diode 65 and forms the pulse input on line 66 to the binary counter 12 and on line 67 to the interdigit timer 13.

Referring now to FIG. 3, line A shows the audio input applied at terminal 50. This is a 1500-cycle signal which which is interrupted to provide pulses. Line B shows the voltage at the collector electrode of transistor 57 and shows that a pulse is produced each time the input signal is terminated or interrupted. Line C shows the pulses which are passed by diode 65 and which appear on lines 66 and 67 to counter 12 and timer 13.

The pulses appearing on line 66, which form the input to the binary counter 12 (FIG. 2), are applied through capacitor 69 to the first stage 14 of the binary counter. The binary counter 12 may be of generally standard construction with each of the stages 14, 15, 16 and 17 being a bistable multivibrator or binary circuit of known construction. In each stage the right hand transistor is designated by the numeral for the stage followed by the letter A, and the left hand transistor is designated by the numeral for the stage followed by the letter B. In each case the right hand transistor is normally conducting. The stages are set to this condition by action of reset amplifier 70, which is connected through a biasing resistor to the base electrode of each of the right hand transistors 14A, 15A, 16A and 17A of the counter stages.

When a pulse is applied from the line 66 to the counter stage 14, transistor 14B becomes conducting, and transistor 14A is turned off. The second pulse applied turns transistor 14A on and transistor 14B off, and this produces a positive pulse at the collector of transistor 14A which is applied through capacitor 72 to the next stage 15. This causes transistor 15B to conduct and transistor 15A to be cut off.

After the stage 14 is turned on and off by subsequent pulses, the second pulse applied from stage 14 to stage 15 will cut off transistor 15B and render transistor 15A conducting again. When transistor 15A conducts a positive pulse at its collector electrode will be applied through capacitor 73 to the stage 16. This will render transistor 16B conducting and cut off transistor 16A.

The action of the stages of counter 12 are the normal action of a binary counter wherein the second pulse applied to one stage will produce a pulse which is applied to the following stage. Accordingly, the second pulse applied to stage 16 will produce a pulse at the collector electrode of transistor 16A which is applied through capacitor 74 to the stage 17 to render this stage conducting. The counter shown, however, includes an additional provision for turning transistor 16B of stage 16 back on when transistor 17A of the next stage is turned off. This is accomplished by a negative voltage fed back from the collector of transistor 17A through resistor 75 and diode 76 to the base of transistor 16B. This turns on transistor 16B so that this transistor is always conducting when transistor 17B of stage 17 is conducting.

Reference is again made to FIG. 3 for a consideration of the action of the binary counter 12. In FIG. 3 an example is given wherein the tone is first interrupted a single time to provide a reset pulse and then is interrupted three times, six times, and nine times to represent the digits 3, 6 and 9 of a code number. As previously stated, the number 1 cannot be used as a digit of a code number, since a single pulse provides reset operation.

Line D of FIG. 3 shows the operation of the stage 14 of the binary counter, line E shows the operation of stage 15, line F shows the operation of stage 16, and line G shows the operation of the stage 17. The lines represent the voltage at the collector electrodes of the left hand transistors which are normally cut off, and this is represented by the base line. When the left hand transistor is rendered conducting, a voltage is developed at its collector electrode and this is shown as a pulse on the lines in FIG. 3. Line D shows that the single reset pulse causes the transistor 14B of stage 14 to conduct for an interval until the counter is reset by the reset amplifier 70, which is controlled by interdigit timer 13 as will be described. When three pulses are applied for the first digit, line D shows that transistor stage 14B is turned on by the first pulse, off by the second pulse and then on again by the third pulse. When the stage is turned off by the second pulse, the transistor 15B of the second stage is turned on as shown by line E.

Considering the sequence of nine pulses, as shown by line D the stage 14B is turned on and off four times and then on again. Line E shows that transistor 15B of the second stage is turned on by the second pulse, off by the fourth pulse, on by the sixth pulse and off by the eighth pulse. Line F shows that transistor 16B of the third stage is turned on by the fourth pulse and although this would be turned off by the eighth pulse, as has been described, this transistor will be turned on by action of stage 17. At the eighth pulse, the transistor 17B of the fourth stage is turned on, as shown by line G. As previously described the coupling from the fourth stage back to the third stage turns on transistor 16B so that, in effect, this transistor remains on from the beginning of the fourth pulse until the pulse counter is reset.

Considering now the operation of the interdigit timer 13, as previously explained pulses from the input detector 10 are applied through conductor 67 to the interdigit timer. These pulses are applied to transistor 80 which is normally saturated. The positive pulses applied cut off the transistor 80 so that its collector is momentarily negative. This negative pulse is applied to the base of transistor 81 causing its emitter electrode to go negative to charge capacitor 82. The voltage across capacitor 82 is applied through resistor 83 and across resistor 84 to transistor 85 of a Schmitt trigger which functions as a squaring circuit. Transistor 86 of the Schmitt trigger is normally conducting, and transistor 85 is normally non-conducting, but is turned on by the voltage developed across capacitor 82. At the end of the initial pulse, transistor 80 again saturates and transistor 81 is cut off so that capacitor 82 discharges through resistors 83 and 84. Subsequent pulses applied from line 67 to transistor 80 turn on transistor 81 to recharge capacitor 82 so that it holds the Schmitt trigger in the state with transistor 85 conducting and transistor 86 cut off. At the end of a pulse group, capacitor 82 can discharge to a level such that the Schmitt trigger returns to its original state, that is, transistor 85 is turned off and transistor 86 conducts. When transistor 86 is turned on, a positive pulse is applied from its collector electrode through conductor 87 and capacitor 88 to the reset amplifier 70. This causes the stages of the binary counter to be reset so that the right hand transistor of each is conducting.

The action of the interdigit timer 13 is illustrated by lines H and J on FIG. 3. Line H represents the voltage across capacitor 82, and shows that this charges to a negative value by each pulse. When the group including three pulses is applied for the first digit, although the capacitor discharges between individual pulses, it does not discharge completely to allow the Schmitt trigger to return to its original state. Similar action takes place during the groups of six and nine pulses.

Line J indicates the operation of the Schmitt trigger circuit, and shows the voltage at the collector of transistor 85. This voltage becomes positive when the first pulse is applied, and remains positive until after the pulse group is completed and the capacitor 82 discharges to a level allowing the Schmitt trigger to return to its original state. Accordingly, the positive voltage is present during an entire pulse group and for a predetermined period following a pulse group.

Line K shows the action of the reset amplifier 70 which is actuated by a pulse from transistor 86. Inasmuch as transistor 86 is turned on when transistor 85 is turned off, the reset amplifier provides a pulse at the termination of the voltage pulses shown in line J. As previously stated, the pulses shown by line K reset the stages of the binary counter 12.

As previously stated, the digit counter 26 includes three stages 27, 28 and 29 for use with a three-digit calling code number. Pulses from the collector of transistor 85 of interdigit timer 13 are applied through conductor 90 and capacitor 91 to transistor 92 which forms a drive amplifier for the digit counter. The stages of the counter each include a PNP and NPN transistor pair, with each pair saturating in turn as input pulses are applied by the drive amplifier 92. The two transistors of each stage are designated by the stage designation followed by A and B. Reset amplifier 95, controlled by reset gate 42, is coupled to the third stage 29 of the digit counter, and in the reset condition the transistors of the third stage are conducting.

The drive transistor 92 is normally saturated, and when a positive pulse is applied thereto from interdigit timer 13, transistor 92 is momentarily cut off and a negative going pulse appears at its collector. This is applied through resistor 93 to the emitter electrodes of transistors 27B, 28B and 29B. The negative pulse applied to the emitter of transistor 29B turns off this transistor, and as its collector goes negative the base of transistor 29A which is connected thereto also goes negative. As transistor 29B is cut off, capacitor 96 connected to its collector electrode starts to charge to the negative supply. Capacitor 96 is coupled to the base of transistor 27B and as it charges it will drive the base of transistor 27B negative. Therefore transistor 27B will start to conduct so that its collector will go positive and in turn drive the base of transistor 27A positive. The collector of transistor 27A goes negative which drives the base of transistor 27B more negative to reinforce the action so that the transistors 27B and 27A are rapidly saturated. The next pulse applied from drive amplifier 92 will turn off transistors 27B and 27A and allow condenser 97 to charge so that transistors 28A and 28B of the second counter stage 28 are rendered conducting. Similarly a further pulse with drive amplifier 92 will cut off stage 28 and allow capacitor 98 to charge to render the third stage 29 conducting. The action described assumes that the digit counter 26 is not reset between the pulses applied by the drive amplifier 92.

Reset pulses are applied from interdigit timer 13 through line 87 and resistor 100 and capacitor 101 to digit reset gate 42 at the termination of each pulse group. If the gate 42 is not inhibited by the null detector 25, as will be explained, gate 42 applies a pulse through capacitor 102 to reset amplifier 95 to reset the digit counter so that the third stage 29 conducts.

Lines M, N and O in FIG. 3 illustrate the operation of the digit counter. As previously stated, the third stage 29 is normally conducting, and this is represented by line O. When a single reset pulse is applied, the timer 13 applies a pulse to the drive amplifier 92 which causes conduction to transfer from the third stage 29 of the ring counter to the first stage 27. This is shown by the drop of the voltage on line O for stage 29, and the rise in voltage on line M representing stage 27. As the first pulse is merely to reset the system, after a time interval the interdigit timer 13 will apply a reset pulse to line 87 to return the conduction to stage 27 as previously described.

Considering the operation resulting from pulses representing the three digits three, six and nine, line M shows that during the first digit stage 27 is conducting, line N shows that during the second digit stage 28 is conducting, and line O shows that during the third stage 29 is conducting. This is on the condition that the digit counter is not reset because of an improper number in the applied code signal, as will be explained.

As explained in connection with FIG. 1, voltages are applied to the first input of null detector 25 through summing resistors connected to binary counter 12, and to the second input through individual resistors selectively connected to the stages of digit counter 26. Considering first the summing resistors 20, 21, 22 and 23 connected to the stages 14, 15, 16 and 17 of binary counter 12, it is seen that each resistor is connected to the collector electrode of the left hand transistor of its associated counter stage. Resistor 20 is connected to the collector of transistor 14B and when this transistor conducts in response to pulses applied to the stage 14, current is applied from the collector electrode through resistor 20 in series with resistor 104. This provides a voltage across resistor 104 at input 105, which is the first input of the null detector 25. Resistors 20, 21, 22 and 23 have value selected so that current through resistor 20 alone provides a voltage across resistor 104 representing an amount of one, resistor 21 provides current to produce a voltage across resistor 104 representing an amount of two, and resistors 22 and 23 each have values to provide current which produces a voltage across resistor 104 representing an amount of four.

It will be apparent from a consideration of the circuit that when two pulses are applied to the counter 12, only transistor 15B is conducting to provide current through resistor 21 so that the voltage across resistor 104 represents the amount of two. When three pulses are applied, both transistors 14B and 15B are conducting so that currents are applied through both resistors 20 and 21 and the total current provides a voltage across resistor 104 representing the amount three. When the transistors 14B, 15B, 16B and 17B are conducting in various combinations, the currents through the resistors 20, 21, 22 and 23 are summed to provide voltages across resistor 104 representing the numerals from two to ten, as a count of one is a self resetting count.

The individual resistors 32 to 40 inclusive are arranged to be selectively connected to the collector electrodes of transistors 27B, 28B and 29B of the stages of the digit counter 26. Plug and jack connections can be provided so that the connections can be easily changed to change the code number to which the decoder responds. In the example represented in FIG. 3, the first digit of the code number is the numeral three so that the collector of transistor 27B of stage 27 is connected through diode 106 to individual resistor 33. This is represented by the dotted line connection. The numeral for the second digit of the code number is six so that the collector electrode of transistor 28B is connected through diode 107 to resistor 36. The numeral for the third digit is nine so that the collector electrode of transistor 29B of the third stage of digit counter 26 is connected through diode 108 to resistor 39. The values of the individual resistors 32 and 40 are selected so that an individual resistor connector to a collector electrode of a digit counter stage which is energized provides current therethrough in series with resistor 109 to provide a voltage across resistor 109 representing the numeral to be selected. This voltage is applied to the second input 110 of the null detector.

The resistance of resistor 32 is such that when this resistor is connected to a conducting stage of the digit counter 26, it will apply current to produce a voltage across resistor 109 corresponding to an amount of two. When resistor 33 is connected it applies a greater current so that the voltage across resistor 109 is greater to represent the amount of three. Similarly the values of the resistors decreases as the numeral represented increases, so that the voltage across resistor 109 increases and is related to the numeral represented.

The voltages at the inputs 110 and 105 of the null detector 25 are shown by lines P and Q of FIG. 3, respectively. When the stages of digit counter 26 are connected to resistors 33, 36 and 39 representing the numerals three, six and nine respectively, the third stage of digit counter 26 which is normally conducting applies a voltage to input 110 representing the numeral nine. When counter 26 is operated by a single pulse so that the first counter stage 27 conducts, the voltage at the input 110 drops to the value representing the numeral three. It will be apparent that during the first digit of the code number, the voltage on line P remains at the value representing the numeral three, during the second digit it provides a higher value representing the numeral six, and during the third digit when the third stage conducts a still higher voltage is provided representing the numeral nine.

Line Q representing the voltage at the input 105 provided by current from the pulse counter through the summing resistors increases by steps as the various stages of the counter are actuated. The reset pulse causes the first stage to be operated and a voltage representing the numeral one is provided. This pulse resets the system and the voltage is removed. For the first digit which is the numeral three, the counter steps through three steps to a voltage representing the numeral three. For the second digit the counter makes six steps to the numeral six, and during the third digit the counter makes nine steps to the numeral nine.

The input 105 of the null detector 25 is coupled to the base of transistor 112 which functions as an emitter follower amplifier, and which is in turn connected to the base of transistor 113 which is a second emitter follower amplifier. The emitter of transistor 113 is connected through diode 114 to the emitter of transistor 115, and through resistor 116 to the base of transistor 117. Similarly the voltage at input 110 of null detector 25 is connected to the base of transistor 118 which forms an emitter follower amplifier, and which is in turn connected to the base of transistor 119 which is also an emitter follower amplifier. The emitter of transistor 119 is connected through diode 120 to the emitter of transistor 117, and through resistor 121 to the base of transistor 115. The input voltages therefore control the bias applied between the base and emitter electrodes of transistors 115 and 117. Transistors 115 and 117 provide the detector output, which is developed at their collector electrodes which are connected together, and through resistors 122 and 123 to a reference potential.

When the voltages applied to input terminals 105 and 110 are the same, resulting from a number of pulses applied to the binary counter the same as the numeral represented by the resistor connected to the digit counter, the voltages on corresponding elements of transistors 112 and 118, 113 and 119, 115 and 117 are equal. The values of the circuit components are such that when the voltages applied to the two inputs of the null detector are equal, transistors 115 and 117 will have their emitter to base junctions reverse biased holding transistors 115 and 117 cut off. When this occurs, the voltage at the junction between resistors 122 and 123 is positive. This voltage is applied to the base of transistor 125 which is normally conducting. The positive voltage applied to the base of transistor 125 cuts off this transistor so that a negative voltage is produced at its collector electrode, which is fed through conductor 126 and resistor 127 to the digit reset gate 42. This voltage acts to inhibit the action of the digit reset gate as will be further described. The voltage at the collector of transistor 125 is also applied through resistor 128 to the output gate 43.

In the event that the number of pulses applied to the pulse counter 12 is less than the number set up in the digit counter, the voltage applied to the input 105 is less positive, and more negative, than the voltage applied to the input 110. This forward biases transistor 115 and turns it on, so that the collector of transistor 115 becomes negative and a negative voltage is applied to the base of transistor 125 to saturate it. On the other hand, when the pulse counter 12 is at a higher number than that set up in the digit counter, the voltage at input 105 applied to the base of transistor 112 is more positive than the voltage at the input 110 applied to the base of transistor 118, and this forward biases transistor 117. Transistor 117 therefore conducts so that the collector thereof becomes negative applying a negative voltage to the base of transistor 125 to saturate it.

Accordingly, the voltage applied to the base of transistor 125 is negative when there is a no null condition, and since this transistor is normally conducting this voltage does not cause it to change its state. However, when there is a null condition, a positive voltage is applied to the base of transistor 125 to cut off this transistor, so that a negative potential is applied from its collector electrode to the digit reset gate 42 and to the output gate 43. The output of the transistor 125 is shown by the line R in FIG. 3.

Inasmuch as the null detector must sense small changes in voltage, it is essential that changes in voltage resulting from changes in temperature are not sensed as a no null condition. To provide temperature compensation, thermisters 130 and 131 are provided which change the bias on transistors 115 and 117 with changes in temperature. At higher than normal temperatures, the values of resistance of thermisters 130 and 131 will decrease. This increases the voltage drop across resistors 116 and 121 which in turn increases the reverse bias on transistors 115 and 117 to hold these transistors cut off at higher temperatures. At lower than normal temperatures, the resistance values of the thermisters will increase. This decreases the voltage drop across resistors 116 and 121 to in turn decrease the reverse bias on transistors 115 and 117, so that these transistors will conduct more easily when the inputs are different by a small amount.

As previously stated, at the end of each pulse group the interdigit timer is restored to its normal condition wherein transistor 86 conducts. In such case a pulse is applied from the collector of transistor 86 on line 87 through resistor 100 and capacitor 101 to the digit reset gate 42. This conditions the reset gate 42 for operation at the end of each pulse group. However, if the applied pulse group has actuated the binary counter 12 to provide an input through the summing resistors to null detector 25 which is the same as the input applied thereto from the resistor connected to the energized stage of digit counter 26, the null detector provides an output from transistor 125 which inhibits the action of the digit reset gate 42. This is shown by line L in FIG. 3 wherein the pulses occur at the same times as the pulses on line K, but wherein the pulses are inhibited when a null is present as indicated by the action on line R.

Considering now the operation of output gate 43, as previously stated when a null condition exists, a pulse is applied from transistor 125 through resistor 128 to this gate. This is a negative pulse applied to the cathode of the diode which forms the gate. The output gate is also connected to the third stage 29 of digit counter 26 through conductor 135 and resistor 136. This applies a negative voltage to the anode of the diode of the gate, which is reduced when the stage 29 conducts. This voltage is balanced against the voltage applied to the cathode of the digit gate, so that when a null condition exists and the third stage of digit counter 26 conducts, the output gate is just biased off.

A third input is applied to the output gate 43 from the interdigit timer 13. This is provided by the connection from the collector of transistor 85 through conductor 138 and capacitor 139 to the cathode of the diode of the output gate. When transistor 85 is turned off at the end of a pulse group, a negative potential is applied from the collector electrode of transistor 85 to the cathode of the output gate. This is applied through the gate when it is just biased off because a null exists and the third stage of counter 26 conducts. However, if there is no null, and the third stage of counter 26 does not conduct, the back bias on output gate 43 is too great for the pulse from the interdigit timer 13 to overcome and there is no output through the gate 43.

The pulses applied through output gate 43 are applied to the base of transistor 140 through capacitor 141. These pulses cause transistor 140 to conduct, as well as transistor 142 which with transistor 140 form a bistable circuit to operate relay 46. The collector electrode of transistor 140 is connected to output terminal 145 connected to relay 46, to operate an external device providing an indication that the preset code number is received. This may be a buzzer or other audible device. The terminal 145 remains energized until a reset pulse is applied in the system at the end of the pulse groups which represent a code number. This causes the digit counter to step from the third stage to the first stage, and when the third stage 29 is turned off, a negative pulse is applied from the collector electrode of transistor 29B to line 135, and through capacitor 146 and diode 147 to the base of transistor 142. This causes transistor 142, as well as transistor 140, to be cut off to de-energize the terminal 145.

When transistor 140 is initially rendered conducting, a positive pulse is fed from its collector electrode through resistor 149 to the base electrode of transistor 150. This causes transistors 150 and 151 to conduct to energize terminal 152 which may be connected to a light or other indicating means to indicate that the desired code signal has been received. Transistors 150 and 151 will remain conducting until a pulse is applied to terminal 154 to reset the same. This may be provided manually by an operator. Accordingly, while the terminal 145 is energized for only a limited duration, the terminal 152 is energized continuously until reset. This makes it possible to provide an audible indication for a short period, and a visual indication which continues until reset by the operator.

It may be desired to energize the call light only after the buzzer or other audible device has been turned off. In such case transistor 150 is connected to the transistor 140 so that transistor 150 is rendered conducting when transistor 140 is cut off.

In accordance with the invention, a digital decoder system is provided which has been found to be highly satisfactory in many applications. The decoder of the invention has the highly advantageous feature that the code number can be changed readily by simple changes in connections. Only a single connection must be changed for each digit in the code number, and in the example which has been used to change a three digit code number to a different number in which all of the digits are different requires changing only three connections. In the event that only one digit in the code number is to be changed, then only one connection must be changed. Although the particular system described has been found to be highly satisfactory, the feature of comparing an analog voltage produced by received pulses with a preset voltage which may be selected by a simple change in connection, may have application in other systems. Similarly, the null detector described may have application in other systems, such as systems using different types of counters and providing different controls.

I claim:

1. A digital decoder for responding to a code number represented by a plurality of pulse groups applied in sequence and corresponding to the digits of the code number, said decoder including in combination, a multistage binary counter to which the pulses of each group are applied, a plurality of summing resistors individually connected to said stages of said counter, a ring counter having a number of stages corresponding to the digits of the code number, a plurality of individual resistors corresponding to the numbers of the digits of a code number, means selectively connecting said stages of said ring counter to said individual resistors, an interdigit timer responsive to the first pulse of each group for actuating said ring counter from one stage to the next and responsive to the completion of a pulse group for resetting said binary counter, and a null detector having a first input connected to said summing resistors and a second input connected to said individual resistors, said stages of said binary counter applying current through said summing resistors to provide a voltage at said first input, each of said stages of said ring counter when actuated applying current through said individual resistor connected thereto to provide a voltage at said second input, said null detector indicating when said voltages at said first and second inputs thereof correspond.

2. A digital decoder for responding to a code number represented by a plurality of pulse groups applied in sequence and corresponding to the digits of the code number, said decoder including in combination, a multistage binary counter to which the pulses of each group are applied, a plurality of summing resistors individually connected to said stages of said counter, a ring counter having a number of stages corresponding to the digits of the code number, a plurality of individual resistors corresponding to the numbers of the digits of a code number, means selectively connecting said stages of said ring counter to said individual resistors, an interdigit timer responsive to the first pulse of each group for actuating said ring counter from one stage to the next and responsive to the completion of a pulse group for resetting said binary counter, reset gate means connected to said timer and to said ring counter for resetting said ring counter at the completion of a pulse group and a null detector having a first input connected to said summing resistors and a second input connected to said individual resistors, said stages of said binary counter applying current through said summing resistors to provide a voltage at said first input, each of said stages of said ring counter when actuated applying current through said individual resistor connected thereto to provide a voltage at said second input, said null detector being connected to said reset gate means for inhibiting the action thereof when said voltages at said first and second inputs of said null detector correspond.

3. A digital decoder for responding to a code number represented by a plurality of pulses applied thereto including in combination, first means responsive to the applied pulses for providing a first analog voltage representing the number of applied pulses, second means for providing a second analog voltage representing a particular number, said second means including a plurality of resistors having values representing different numbers, means for applying current and means for selectively connecting one of said resistors to said current applying means to provide a second analog voltage across the connected resistor having a value determined by the value of such resistor, and means having a first input connected to said first means and responsive to said first analog voltage and a second input connected to said second means and responsive to said second analog voltage for comparing said first and second voltages to indicate when the number of applied pulses corresponds to the resistor selected.

4. A digital decoder for responding to a code number represented by a plurality of pulse groups applied in sequence and corresponding to the digits of the code number, said decoder including in combination, first means responsive to the pulses of each group for providing a first analog voltage representing each digit of the code number, second means including a plurality of resistors corresponding to numbers of a digit and means selectively connected to the resistor for a particular digit for applying current thereto to provide an analog voltage thereacross representing the particular digit, and a null detector having a first input connected to said first means and responsive to said first analog voltage and a second input connected to said second means and responsive to said second analog voltage, said null detector indicating when said voltages at said first and second inputs thereof correspond.

5. A digital decoder for responding to a code number represented by a plurality of pulse groups applied in sequence and corresponding to the digits of the code number, said decoder including in combination, a multistage binary counter to which the pulses of each group are applied, a plurality of summing resistors individually connected to said stages of said counter, a ring counter having a number of stages corresponding to the digits of the code number, a plurality of individual resistors corresponding to the number of the digits of a code number, means for selectively connecting said stages of said ring counter to said individual resistors, reset gate means connected to said ring counter for resetting the same, and a null detector having a first input connected to said summing resistors and a second input connected to said individual resistors, said stages of said binary counter applying current through said summing resistors to provide a voltage at said first input, each of said stages of said ring counter when actuated applying current through said individual resistor connected thereto to provide a voltage at said second input, said null detector being connected to said reset gate means for inhibiting the action thereof when said voltages at said first and second inputs correspond.

6. A digital decoder for responding to a code number represented by a plurality of pulse groups applied in sequence and corresponding to the digits of the code number, said decoder including in combination, first counter means responsive to the pulses of each group and including means providing a first analog voltage corresponding to the number of pulses in each applied pulse group, second counter means including a plurality of selectively actuated portions, a plurality of resistors corresponding to the numbers of a digit and means for selectively connecting each portion to one of said resistors, and a null detector having a first input connected to said first counter means and a second input connected to said resistors, said first counter means providing a voltage at said first input corresponding to the number of pulses applied thereto, each of said portions of said second counter means when actuated applying current through said resistor connected thereto to provide a second analog voltage at said second input corresponding to a predetermined digit, said null detector indicating when said voltages at said first and second inputs thereof correspond.

7. A digital decoder for responding to a code number represented by a plurality of pulse groups applied in sequence and corresponding to the digits of the code number, said decoder including in combination, a multistage binary counter to which the pulses of each group are applied, a plurality of summing resistors individually connected to said stages of said counter, a ring counter having a number of stages corresponding to the digits of the code number, a plurality of individual resistors corresponding to the numerals of the digits of a code number, means selectively connecting said stages of said ring counter to said individual resistors, an interdigit timer coupled to said counters and responsive to the first pulse of each group for actuating said ring counter from one stage to the next and responsive to the completion of a pulse group for resetting said binary counter, reset gate means connected to said timer and to said ring counter for resetting said ring counter at the completion of a pulse group, and a null detector having a first input connected to said summing resistors and a second input connected to said individual resistors, said stages of said binary counter applying current through said summing resistors to provide a voltage at said first input, the actuated stage of said ring counter applying current through said individual resistor connected thereto to provide a voltage at said second input, said null detector including first and second transistors each having base, emitter and collector electrodes, resistor means connecting said collector electrodes of said first and second transistors to a reference potential, said null detector including first means connecting said first input to said base electrode of said first transistor and said emitter electrode of said second transistor, and second means connecting said second input to said base electrode of said second transistor and said emitter electrode of said first transistor, said first and second transistors being reverse biased by said first and second means when the voltages of said first and second inputs are the same so that said transistors are not conducting, and a third transistor connected to said resistor means and responsive to the voltage across said resistor means to provide an output when said first and second transistors are non-conducting, said third transistor means being connected to said reset gate means and inhibiting the action thereof when said voltages at said first and second inputs of said null detector correspond.

8. A digital decoder for responding to a code number represented by a plurality of pulse groups applied in sequence and corresponding to the digits of the code number, said decoder including in combination, multistage pulse counter means to which the pulses of each group are applied, a ring counter having a number of stages corresponding to the digits of the code number, an interdigit timer responsive to the first pulse of each group for actuating said ring counter from one stage to the next and responsive to the completion of a pulse group for resetting said pulse counter, reset gate means connected to said timer and to said ring counter and adapted to reset said ring counter at the completion of a pulse group, and a null detector having a first input connected to said pulse counter and a second input connected to said ring counter, said pulse counter means providing a voltage at said first input representing the pulses of a received number, the actuated stage of said ring counter providing a voltage at said second input, said null detector including first and second transistors having base, emitter and collector electrodes, resistor means connecting said collector electrodes of said first and second transistors to a reference potential, said null detector including first means connecting said first input to said base electrode of said first transistor and said emitter electrode of said second transistor and second means connecting said second input to said base electrode of said second transistor and said emitter electrode of said first transistor, said first and second transistors being reverse biased by said first and second means when the voltages at said first and second inputs are the same so that said transistors are not conducting, and a third transistor connected to said resistor means and responsive to the voltage across said resistor means to provide an output when said first and second transistors are non-conducting, said third transistor means being connected to said reset gate means and inhibiting the action thereof when said voltages at said first and second inputs of said null detector correspond.

9. A digital decoder for responding to a code number represented by interruptions of a tone signal to provide a plurality of pulse groups applied in sequence and corresponding to the digits of the code number, said decoder including in combination, pulse detector means responsive to a tone signal of a predetermined frequency and operative to produce a pulse at each interruption of the tone signal, a multistage binary counter coupled to said detector means and responsive to pulses therefrom, a plurality of summing resistors individually connected to the stages of said counter, a ring counter having a number of stages corresponding to the digits of the code number, a resistor connected to each stage of said ring counter having a value corresponding to the numeral of the associated digit of the code number, an interdigit timer coupled to said detector means and responsive to the first pulse of each group for actuating said ring counter from one stage to the next and responsive to the completion of a pulse group for resetting said binary counter, reset gate means connected to said timer and to said ring counter for resetting said ring counter at the completion of a pulse group, a null detector having a first input connected to said summing resistors and a second input connected to said resistors connected to said ring counter, said stages of said binary counter applying current through said summing resistors to provide a voltage at said first input, the actuated stage of said ring counter applying current through the connected resistors to provide a voltage at said second input, said null detector being connected to said reset gate means and applying a voltage thereto to inhibit the action of said reset means when said voltages at said first and second inputs of said null detector correspond, and output gate means connected to said stage of said ring counter associated with the last digit of the code number and to said interdigit timer and said null detector, said output gate means providing an output in response to a voltage from said null detector produced by corresponding voltages at said inputs thereof in combination with a voltage indicating that said stage of said ring counter associated with the last digit is operative, and a voltage from said interdigit timer indicating completion of a pulse group.

10. A digital decoder for responding to a code number represented by interruptions of a tone signal to provide a plurality of pulse groups applied in sequence and corresponding to the digits of the code number, said decoder including in combination, pulse detector means responsive to a tone signal of a predetermined frequency and operative to produce a pulse at each interruption of the tone signal, a multistage binary counter coupled to said detector means and responsive to pulses therefrom, a plurality of summing resistors individually connected to the stages of said counter, a ring counter having a number of stages corresponding to the digits of the code number, a plurality of individual resistors corresponding to the numerals of the digits of a code number, means selectively connecting said stages of said ring counter to said individual resistors, an interdigit timer coupled to said detector means and responsive to the first pulse of each group for actuating said ring counter from one stage to the next and responsive to the completion of a pulse group for resetting said binary counter, reset gate means connected to said timer and to said ring counter for resetting said ring counter at the completion of a pulse group, a null detector having a first input connected to said summing resistors and a second input connected to said resistors connected to said ring counter, said stages of said binary counter applying current through said summing resistors to provide a voltage at said first input, the actuated stage of said ring counter applying current through the connected resistor to provide a voltage at said second input, said null detector being connected to said reset gate means and applying a voltage thereto to inhibit the action of said reset means when said voltages at said first and second inputs of said null detector correspond, and output gate means connected to said stage of said ring counter associated with the last digit of the code number and to said interdigit timer and said null detector, said output gate means providing an output in response to a voltage from said null detector produced by corresponding voltages at said inputs thereof in combination with a voltage indicating that said stage of said ring counter associated with the last digit is operative, and a voltage from said interdigit timer indicating completion of a pulse group.

11. A digital decoder for responding to a code number represented by interruptions of a tone signal to provide a plurality of pulse groups applied in sequence and corresponding to the digits of the code number, said decoder including in combination, pulse detector means responsive to a tone signal of a predetermined frequency and operative to produce a pulse at each interruption of the tone signal, a multistage binary counter coupled to said detector means and responsive to pulses therefrom, a plurality of summing resistors individually connected to the stage of said counter, a ring counter having a number of stages corresponding to the digits of the code number, a resistor connected to each stage of said ring counter having a value corresponding to the numeral of the associated digit of a predetermined code number, an interdigit timer coupled to said detector means and responsive to the first pulse of each group for actuating said ring counter from one stage to the next and responsive to the completion of a pulse group for resetting said binary counter, reset gate means connected to said timer and to said ring counter for resetting said ring counter at the completion of a pulse group, a null detector having a first input connected to said summing resistors and a second input connected to said resistors connected to said ring counter, said stages of said binary counter applying current through said summing resistors to provide a voltage at said first input, the actuated stage of said ring counter applying current through the connected resistor to provide a voltage at said second input, said null detector being connected to said reset gate means and applying a voltage thereto to inhibit the action of said reset means when said voltages at said first and second inputs of said null detector correspond, output gate means connected to said stage of said ring counter associated with the last digit of the code number and to said interdigit timer and said null detector, said output gate means providing an output in response to a voltage from said null detector produced by corresponding voltages at said inputs thereof in combination with a voltage indicating that said stage of said ring counter associated with the last digit is operative, and a voltage from said interdigit timer indicating completion of a pulse group, and indicator means connected to said output gate means and providing an indication when the predetermined code number is received.

12. A digital decoder for responding to a code number represented by interruptions of a tone signal to provide a plurality of pulse groups applied in sequence and corresponding to the digits of the code number, said decoder including in combination, pulse detector means responsive to a tone signal of a predetermined frequency and operative to produce a pulse at each interruption of the tone signal, a multistage binary counter coupled to said detector means and responsive to pulses therefrom, a plurality of summing resistors individually connected to the stages of said counter, a ring counter having a number of stages corresponding to the digits of the code number, a resistor connected to each stage of said ring counter having a value corresponding to the numeral of the associated digit of a predetermined code number, an interdigit timer coupled to said detector means and responsive to the first pulse of each group for actuating said ring counter from one stage to the next and responsive to the completion of a pulse group for resetting said binary counter, reset gate means connected to said timer and to said ring counter for resetting said ring counter at the completion of a pulse group, a null detector having a first input connected to said summing resistors and a second input connected to said resistors connected to said ring counter, said stages of said binary counter applying current through said summing resistors to provide a voltage at said first input, the actuated stage of said ring counter applying current through the connected resistor to provide a voltage at said second input, said null detector being connected to said reset gate means and applying a voltage thereto to inhibit the action of said reset means when said voltages at said first and second inputs of said null detector correspond, output gate means connected to said stage of said ring counter associated with the last digit of the code number and to said interdigit timer and said null detector, said output gate means providing an output in response to a voltage from said null detector produced by corresponding voltages at said inputs thereof in combination with a voltage indicating that said stage of said ring counter associated with the last digit is operative, and a voltage from said interdigit timer indicating completion of a pulse group, said indicator means being connected to said ring counter and being reset thereby at the termination of the pulse groups corresponding to a code number.

13. A digital decoder for responding to a code number represented by interruptions of a tone signal to provide a plurality of pulse groups applied in sequence and corresponding to the digits of the code number, said decoder including in combination, pulse detector means responsive to a tone signal of a predetermined frequency and operative to produce a pulse at each interruption of the tone signal, a multistage pulse counter coupled to said detector means and responsive to pulses therefrom, a plurality of resistors individually connected to the stages of said counter, a ring counter having a number of stages corresponding to the digits of the code number, a resistor conected to each stage of said ring counter having a value corresponding to the numeral of the associated digit of a predetermined code number, an interdigit timer coupled to said detector means and responsive to the first pulse of each group for actuating said ring counter from one stage to the next and responsive to the completion of a pulse group for resetting said pulse counter, reset gate means connected to said timer and to said ring counter for resetting said ring counter at the completion of a pulse group, a null detector having a first input connected to said resistors of said pulse counter and a second input connected to said resistors connected to said ring counter, said stages of said pulse counter applying current through said resistors thereof to provide a voltage at said first input representing the number of pulses applied to said pulse counter, the actuated stage of said ring counter applying current through the connected resistor to provide a voltage at said second input, said null detector being connected to said reset gate means and applying a voltage thereto to inhibit the action of said reset means when said voltages at said first and second inputs of said null detector correspond, output gate means connected to said stage of said ring counter associated with the last digit of the code number and to said interdigit timer and said null detector, said output gate means providing an output in response to a voltage from said null detector produced by corresponding voltages at said inputs thereof in combination with the voltage indicating that said stage of said ring counter associated with the last digit is operative, and a voltage from said interdigit timer indicating completion of a pulse group, and first and second indicator means connected to said output gate means, said first indicator means providing an audible signal and including automatic resetting means operative at the termination of the pulse groups corresponding to a code number, said second indicator means providing a visible signal and including means for manually resetting the same.

14. A digital decoder for responding to a code number represented by a plurality of pulse groups applied in sequence and corresponding to the digits of the code number, said decoder including in combination, a multistage binary counter to which the pulses of each group are applied, a plurality of summing resistors individually connected to said stages of said counter, a ring counter having a number of stages corresponding to the digits of the code number, a plurality of individual resistors corresponding to the numbers of the digits of a code number, means selectively connecting said stages of said ring counter to said individual resistors, an interdigit timer responsive to the first pulse of each group for actuating said ring counter from one stage to the next and responsive to the completion of a pulse group for resetting said binary counter, a null detector having a first input connected to said summing resistors and a second input connected to said individual resistors, said stages of said binary counter applying current through said summing resistors to provide a voltage at said first input, each of said stages of said ring counter when actuated applying current through said individual resistor connected thereto to provide a voltage at said second input, said null detector indicating when said voltages at said first and second inputs thereof correspond, and output means connected to said null detector and to said last stage of said ring counter for providing an output when the pulses applied to said binary counter produces a voltage at said first input which corresponds to the voltage produced by said last stage of said ring counter at said second input.

15. A digital decoder for responding to a code number represented by a plurality of pulse groups applied in sequence and corresponding to the digits of the code number, said decoder including in combination, a multistage pulse counter to which the pulses of each group are applied, a plurality of resistors individually connected to said stages of said counter, a ring counter having a number of stages corresponding to the digits of the code number a plurality of individual resistors corresponding to the numbers of the digits of a code number, means selectively connecting said stages of said ring counter to said individual resistors, interdigit timer means responsive to the first pulse of each group for actuating said ring counter from one stage to the next and responsive to the completion of a pulse group for resetting said pulse counter, reset gate means connected to said timer and to said ring counter for resetting said ring counter at the completion of a pulse group, a null detector having a first input connected to said resistors of said pulse counter and a second input connected to said individual resistors, said stages of said pulse counter applying current through said resistors thereof to provide a voltage at said first input representing the number of pulses applied to said pulse counter, each of said stages of said ring counter when actuated applying current through said individual resistor connected thereto to provide a voltage at said second input, said null detector being connected to said reset gate means for inhibiting the action thereof when said voltages at said first and second inputs of said null detector correspond, and output means connected to said null detector, said timer means and said last stage of said ring counter for providing an output when the voltages at said inputs of said null detector correspond at the completion of the pulse group representing the last digit of the code number.

References Cited

UNITED STATES PATENTS

| | | | |
|---|---|---|---|
| 2,784,396 | 3/1957 | Kaiser et al. | 340—149 X |
| 3,068,450 | 12/1962 | Fletcher et al. | 340—149 |
| 3,281,593 | 10/1966 | Mendelsohn. | |

NEIL C. READ, *Primary Examiner.*

D. YUSKO, *Assistant Examiner.*